United States Patent [19]
Leanna

[11] Patent Number: 6,105,651
[45] Date of Patent: Aug. 22, 2000

[54] ROTARY HOT FOIL STAMPING APPARATUS

[75] Inventor: Anthony J. Leanna, Green Bay, Wis.

[73] Assignee: Integrated Design Corp., Green Bay, Wis.

[21] Appl. No.: 09/141,616

[22] Filed: Aug. 28, 1998

[51] Int. Cl.[7] .................................................. B32B 31/04
[52] U.S. Cl. .......................... 156/555; 156/583.1; 492/8; 492/46
[58] Field of Search .................. 156/555, 582, 156/583.1; 492/8, 45, 46, 54, 58

[56] References Cited

U.S. PATENT DOCUMENTS

| | | | |
|---|---|---|---|
| 3,457,618 | 7/1969 | O'Neal et al. | 492/8 |
| 3,668,752 | 6/1972 | Clifton et al. | 492/8 |
| 4,517,719 | 5/1985 | Okumura et al. | 492/8 |
| 4,608,737 | 9/1986 | Parks et al. | 492/8 |
| 4,640,808 | 2/1987 | Okumura et al. | 264/46.5 |
| 4,823,102 | 4/1989 | Cherian et al. | 335/306 |
| 4,985,972 | 1/1991 | Sollinger et al. | 492/8 X |
| 5,030,937 | 7/1991 | Loubier et al. | 335/303 |
| 5,938,579 | 8/1999 | Cavazos | 492/8 |

Primary Examiner—James Sells
Attorney, Agent, or Firm—Jansson, Shupe, Bridge & Munger, Ltd.

[57] ABSTRACT

A cylinder assembly is provided for transferring foil onto a substrate. A cylinder assembly includes a generally cylindrical core having an outer surface. The outer surface of the core includes a plurality of magnet receiving depressions therein. Magnets formed from rare earth metals are secured within corresponding depressions in the outer surface of the core. A die plate is positioned about the outer surface of the core. A heating structure heats the outer surface of the die plate to a temperature less than 475° F.

46 Claims, 4 Drawing Sheets

U.S. Patent   Aug. 22, 2000   Sheet 1 of 4   6,105,651
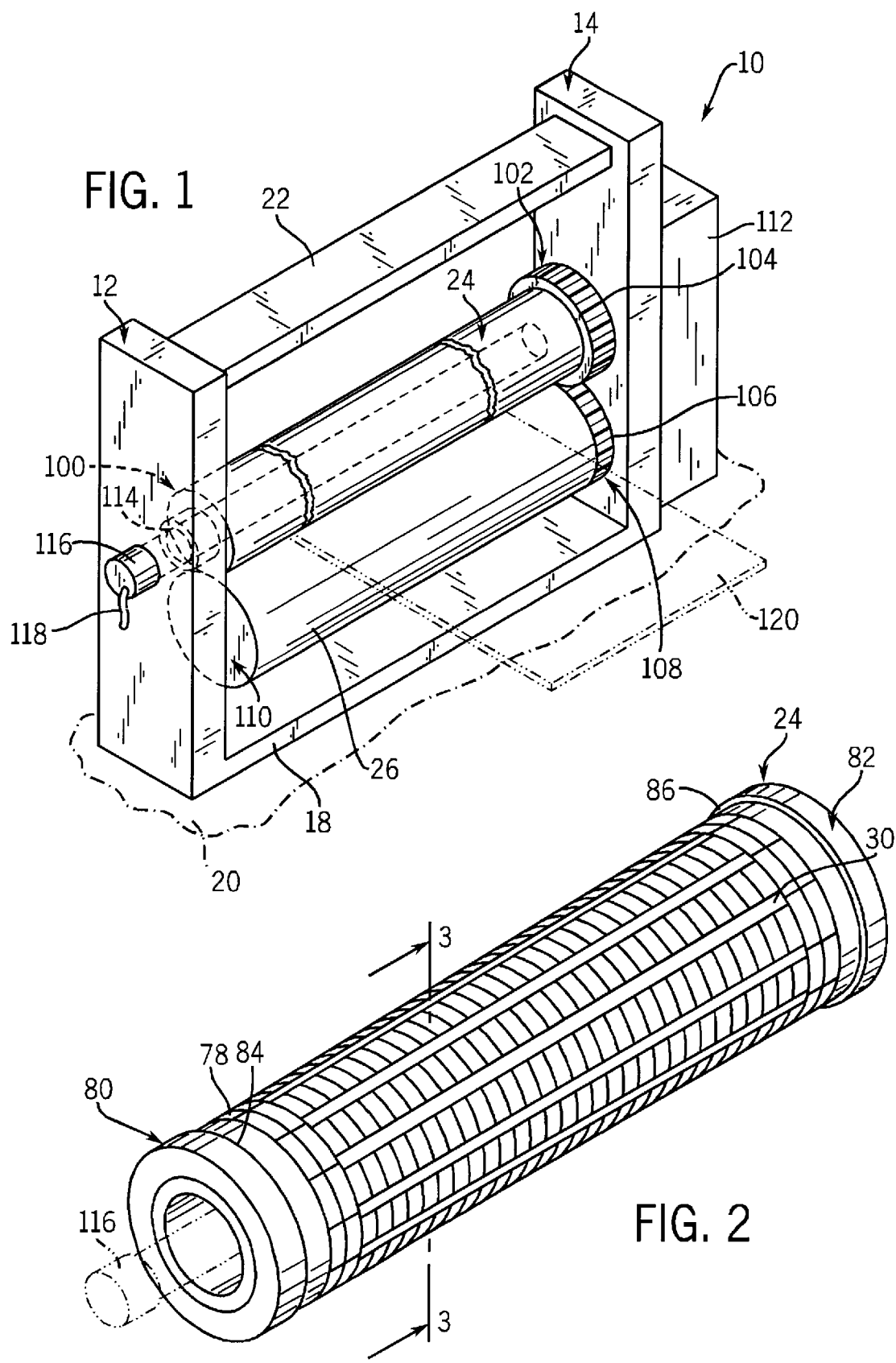

ROTARY HOT FOIL STAMPING APPARATUS

BACKGROUND AND SUMMARY OF THE INVENTION

This invention relates to rotary hot foil stamping systems, in particular, to an improved cylinder for effectuating the transfer of foil onto a substrate.

Rotary hot foil stamping systems typically include a pair of coacting rotary cylinders. The first cylinder acts as a transfer cylinder and includes a tool engraved thereon to create a foil image on a substrate. A web of the substrate and an overlapping web of the foil pass between the transfer cylinder and an impression cylinder. The transfer cylinder is heated to a predetermined temperature such that the tool transfers the foil image onto the substrate.

In order to properly transfer the foil image onto the substrate, the transfer cylinder is typically constructed from a material, such as brass. By using brass, the outer surface of the transfer cylinder can be uniformly heated above predetermined temperature in order to effectuate the transfer of the foil. However, the use of brass or other types of prior art solid transfer cylinders has significant drawbacks.

Since the tool corresponding to the foil image must be engraved on prior art transfer cylinders, the costs associated therewith may be significant. The process of engraving the tool on the transfer roll is very time consuming, and as such, it may take a number of weeks before a user receives a prototype transfer cylinder from an engraver. If there has been an error in the engraving of the tool onto the transfer cylinder, a delay in production may result. In addition, if a user desires a number of different designs of foil to be transferred onto various substrates, a separate transfer cylinder must be engraved with each design. This, in turn, increases the cost to an end user.

Heretofore, individuals contemplating use of rotary hot foil stamping systems had no alternative but use these types of prior art transfer cylinders. Due to the temperature requirements necessary to transfer a foil image onto a substrate, transfer cylinders must be constructed from materials which allow the outer surfaces of the transfer cylinders to be uniformly heated to a predetermined temperature. As such, prior attempts to provide a transfer cylinder that utilized removable plates which could be wrapped around a common cylinder have failed.

Therefore, it the primary object and feature of the present invention to provide a cylinder assembly for transferring foil onto a substrate.

It is a still further object and feature of the present invention to provide a cylinder assembly for transferring foil onto a substrate wherein the tool for transferring the foil may be simply and easily modified.

It is a still further object and feature of the present invention to provide a cylinder assembly for transferring foil onto a substrate which incorporates a tool which is inexpensive to manufacture.

In accordance with the present invention, a cylinder assembly is provided for transferring foil onto a substrate. The cylinder assembly includes a core defining a generally cylindrical outer surface. The outer surface of the core includes a plurality of magnet receiving depressions therein. A plurality of magnets are also provided. Each of the magnets is secured within a corresponding depression in the outer surface of the core. A die plate includes inner and outer surfaces. The inner surface of the die plate engages the outer surface of the core such that die plate is retained on the core by the magnetic force of the magnets. The outer surface of the die plate includes a tool thereon. A heating structure is operatively connected to the core. The heating structure heats the outer surface of the die plate to a predetermined temperature.

In order to ensure the magnets generate sufficient magnetic force to retain the die plate on the core during heating, the magnets are formed from rare earth metals. The magnets are secured within the depressions by an adhesive, preferably an epoxy, which can withstand the heating of the cylinder without failing. The heating structure heats the core either electrically or by oil. In the first embodiment, the core defines a heat element receipt cavity therein. The heating structure includes a cal rod received within the heating element receipt cavity in the core. In the alternative, the core defines a heating passageway therethrough. The heating structure includes a fluid such as heated oil flowing through the heating passageway in the core.

In accordance with a still further aspect of the present invention, a foil transfer device is provided. The foil transfer device includes a cylindrical core rotatable about a first axis and defining an outer surface. The outer surface of the cylindrical core includes a magnet receiving depression therein. A die plate includes first and second edges. The die plate is positioned about the outer surface of the cylindrical core such that the first and second edges of the die plate abut. A magnet is mounted within the magnet receiving depression in the outer surface of the cylindrical core. The magnet retains the die plate about the cylindrical core and prevents slippage of the die plate along the outer surface of the cylindrical core. A heating structure is operatively connected to the cylindrical core for heating the die plate.

An impression roll extends along a second axis which is parallel to and spaced from the axis of rotation of the cylindrical core. The impression roll includes a generally cylindrical outer surface and an impression gear projecting radially therefrom. A core gear extends radially from the outer surface of the core. The core gear meshes with the impression gear such that rotation of the core causes rotation of the impression roll. A drive mechanism is provided for rotating the cylindrical core.

The foil transfer device may include a support for supporting the cylindrical core above a supporting surface. The support includes first and second vertical support legs.

In accordance with a still further aspect of the present invention, a device is provided for transferring foil onto a substrate. The device includes a cylindrical core rotatable about a first axis. The outer surface of the cylindrical core includes a plurality of circumferentially spaced rows of magnet receiving depressions therein. A die plate includes first and second edges and first and second opposite sides. The die plate is positioned about the outer surface of the cylindrical core such that the first and second edges of the die plate abut and such that the first side of the die plate engages the outer surface of the cylindrical core. A plurality of magnets is also provided. Each magnet is mounted within a corresponding magnet receiving depression in the outer surface of the cylindrical core. The magnets retain the die plate about the cylindrical core. It is contemplated that the magnets be formed from a rare earth metal in order to retain the die plate on the cylindrical core when the cylindrical core is heated. The magnets are secured within the depressions by an adhesive, preferably an epoxy. The heating structure is operatively connected to the cylindrical core. The heating structure heats the die plate to a temperature less than 475° F.

An impression roll extends along a second axis spaced from and parallel to the axis of rotation of the cylindrical core. The impression roll includes an impression gear projecting radially from the outer surface thereof. A core gear extends radially from the outer surface of the cylindrical core. The core gear meshes with the impression gear such that rotation of the cylindrical core causes rotation of the impression roll. A drive mechanism is provided for rotating a cylindrical core.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

FIG. 1 is an isometric view of a rotary hot foil stamping system in accordance with the present invention;

FIG. 2 is an isometric view of a cylindrical core of a transfer cylinder for use with the rotary hot foil stamping system of the present invention;

DETAILED DESCRIPTION OF THE DRAWINGS

Figure 3:
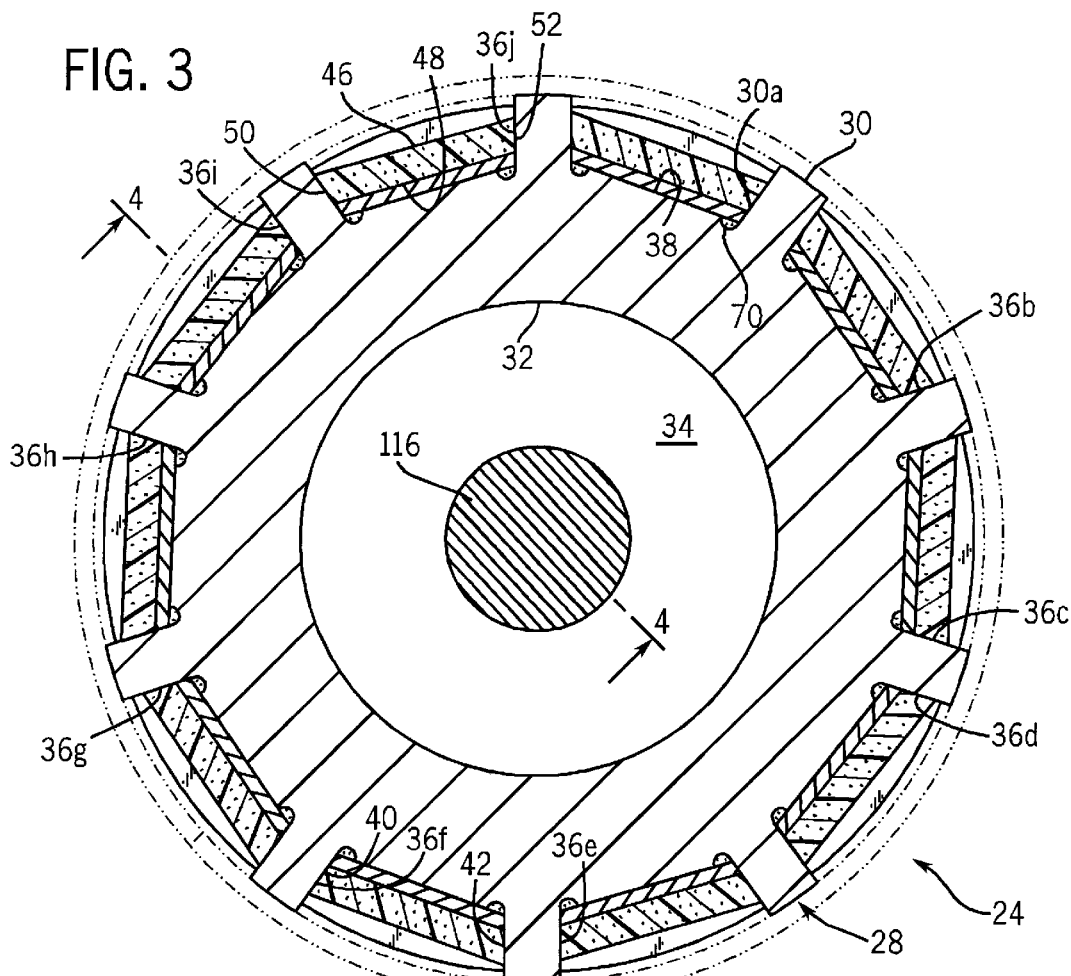
FIG. 3 is a cross-sectional view taken along line 3—3 of FIG. 2.

Referring to FIG. 1, a rotary hot foil stamping system in accordance with the present invention is general designated by the reference number 10. Rotary hot foil stamping system 10 includes first and second vertical support legs 12 and 14 interconnected by a generally horizontal base 18. Base 18 may be positioned on a supporting surface 20. A tie bar 22 also interconnects support legs 12 and 14. Support legs 12 and 14, base 18 and tie bar 22 define a support frame for rotatably supporting transfer cylinder 24 and impression roll 26.

Referring to FIGS. 2 and 3, transfer cylinder 24 includes a generally cylindrical core 28 which extends along a longitudinal axis and has a generally cylindrical outer surface 30. In a first embodiment depicted in FIGS. 2–3, cylindrical core 28 includes a generally cylindrical inner surface 32 which defines a heating element receipt cavity 34 therein.

The outer surface 30 of cylindrical core 28 includes a plurality of circumferentially-spaced magnet receiving troughs 36a–36j. Each magnet receiving trough 36a–36j extends along a corresponding axis which is parallel to the longitudinal axis of cylindrical core 28. Each magnet 44 receiving trough is defined by a bottom wall 38 which is spaced from outer surface 30 of cylindrical core 28 by side walls 40 and 42. Each side wall 40 and 42 extends from bottom wall 38 of each magnet receiving trough 36a–36j and intersects the outer surface 30 of cylindrical core 28.

A plurality of magnets 44 are mounted in each magnet receiving trough 36a–36j. Each magnet 44 has a generally rectangular cross-section and includes top and bottom generally planar surfaces 46 and 48, respectively. Top and bottom surfaces 46 and 48, respectively, of each magnet 44 are spaced by end walls 50 and 52 which diverge from bottom surface 48 and intersect top surface 46 of magnet 44, and by side walls 54 and 56 which are perpendicular to top and bottom surfaces 46 and 48, respectively, of magnet 44.

Figure 4:
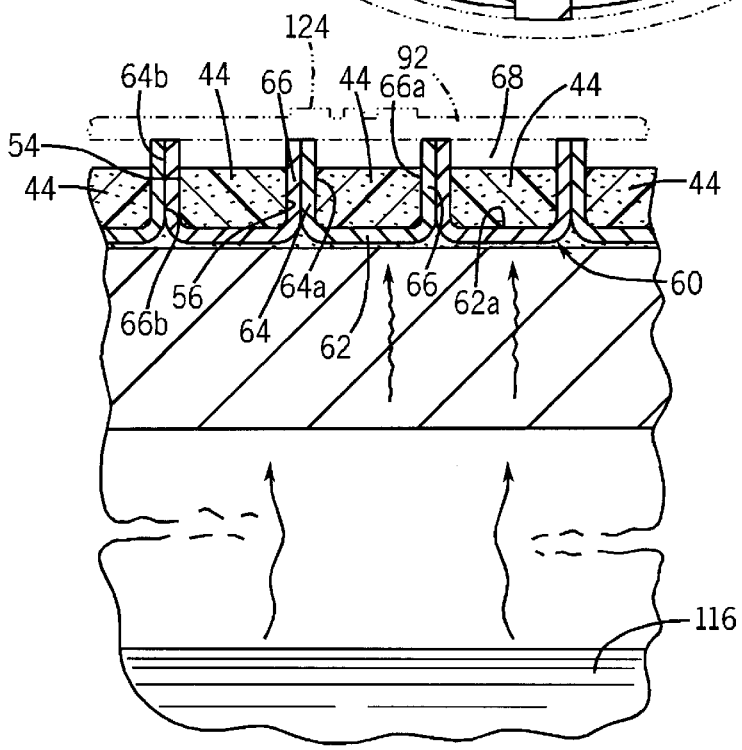
FIG. 4 is a cross-sectional view taken along line 4—4 of FIG. 3.

Each magnet 44 is seated within a corresponding generally u-shaped carrier 60. Each u-shaped magnet carrier 60 includes a base 62 having first and second legs 64 and 66 projecting from opposite sides thereof so as to define a magnet receipt opening 68 therebetween. As best seen in FIG. 4, each magnet 44 is received within a corresponding magnet receipt opening 68 such that the bottom surface 48 of each magnet 44 engages the upper surface 62a of base 62 of corresponding magnet carrier 60 and such that side walls 54 and 56 of each magnet 44 engage corresponding inner surfaces 64a and 66a of legs 64 and 66, respectively, of magnet carrier 60.

As best seen in FIGS. 2 and 4, a plurality of magnet carriers 60 are positioned adjacent one another in each magnet receipt trough 36a–36j such that the outer surface 66b of leg 66 of magnet carrier 60 abuts the outer surface 64b of leg 64 of the adjacent magnet carrier 60. Magnet carriers 60 are retained in their corresponding magnet receipt trough 36a–36j by an adhesive such as epoxy 70.

Cylindrical core 28 further includes enlarged heads 80 and 82 on opposite ends thereof which extend radially from outer surface 30. Heads 80 and 82 define corresponding shoulders 84 and 86, respectively, along outer surface 30 of cylindrical core 28. Shoulders 84 and 86 define a die plate receiving portion 88 of outer surface 30 of cylindrical core 28 therebetween.

Figure 5:
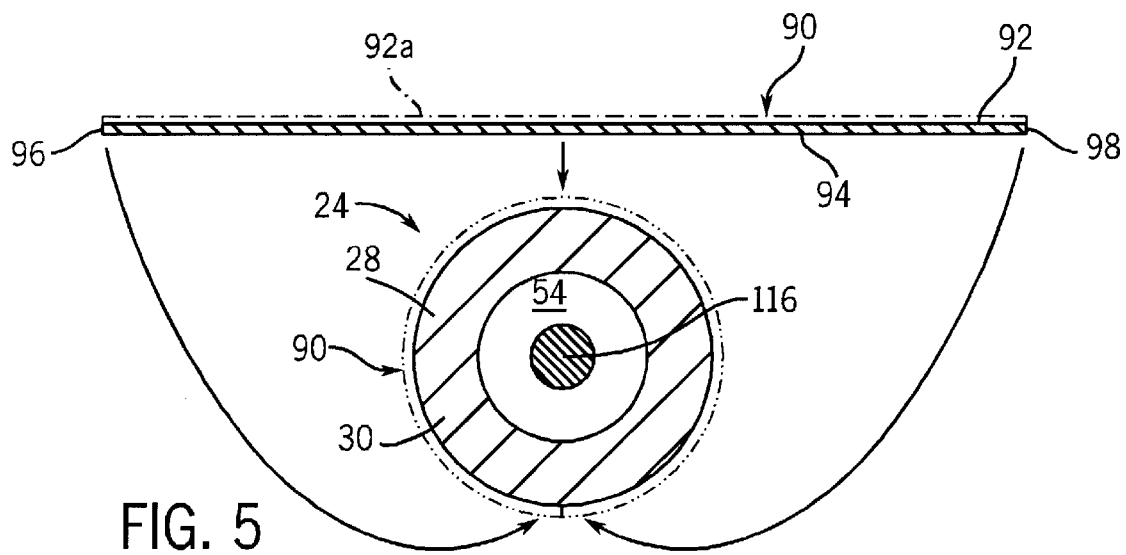
FIG. 5 is an exploded, cross-sectional view showing the positioning of a die plate on the cylindrical core of FIG. 2.

Referring to FIG. 5, a die plate 90 is provided for mounting about the die plate receiving portion 88 of the outer surface 30 of cylindrical core 28. Die plate 90 may be formed as a generally flat plate constructed from a metallic material or from a laminate. The laminate includes an outer layer 92 constructed from a metallic material such as magnesium which may be engraved with the tool to effectuate the transfer of foil. Die plate 90 further includes an inner layer 94 constructed from a material such as steel which facilitates the transfer of heat from cylindrical core 28 to outer layer 92 of die plate 90, and which is attracted to magnets 44 mounted within a magnet receiving troughs 36a–36j in the outer surface 30 of cylindrical core 28.

Die plate 90 further includes first and second parallel side edges 96 and 98, respectively. Die plate 90 is mounted on cylindrical core 28 by wrapping die plate 90 about the die plate receiving portion 80 of the outer surface 30 of cylindrical core 28 such that the first edge 96 abuts second edge 98 of die plate 90. Die plate 90 is retained on cylindrical core 28 by magnets 44 mounted within magnet receiving depression 36a–36j in outer surface 30 of cylindrical core 28, as heretofore described. Shoulders 84 and 86 in outer surface 30 of cylindrical core 28 and magnets 44 prevent slippage of die plate 90 along the outer surface 30 of cylindrical core 28.

Transfer cylinder 24 further includes first and second opposite ends 100 and 102, respectively. Each end 100 and 102 of transfer cylinder 24 is rotatably mounted to corresponding support legs 12 and 14, respectively. End 102 of transfer cylinder 24 includes a gear 104 projecting radially therefrom. Gear 104 of transfer roll 24 meshes with a gear 106 on a first end 108 of impression roll 26. First and second ends 108 and 110, respectively, of impression roll 26 are also rotatably mounted to support legs 14 and 12, respectively. The transfer cylinder 24 and the impression roll 26 are corotated in opposite directions of rotation at the same angular velocity by drive mechanism 112 which is coupled to one of the transfer cylinder 24 or the impression roll 26.

As best seen in FIG. 1, support leg 12 includes an opening 114 therein. Opening 114 in support leg 12 is in axial alignment with heating element receipt cavity 34 in a transfer cylinder 24. A cal rod 116 is inserted through opening 114 in support leg 12 and into heating element receipt cavity 34 within transfer cylinder 24. Cal rod 116 is operably connected by wires 118 to a power source.

In operation, cal rod 116 is heated to predetermined temperature in order to heat cylindrical core 28, and hence die plate 90 mounted thereabout, to a user desired temperature to effectuate the transfer of foil onto a substrate. In the preferred embodiment, the outer surface 92a of the outer layer 92 of die plate 90 is heated to a temperature less than 475° F. A web of material 120 comprising a substrate having an overlapping web of foil is provided. Drive mechanism 112 rotates transfer cylinder 24 and impression roll 26 as heretofore described in order to draw the web of material 120 through the gap therebetween. The engraved tool 124 on the outer surface 92a of die plate 90 engages the foil and transfer an image of foil corresponding to the image of the engraved tool 124 onto the substrate.

Figure 7:
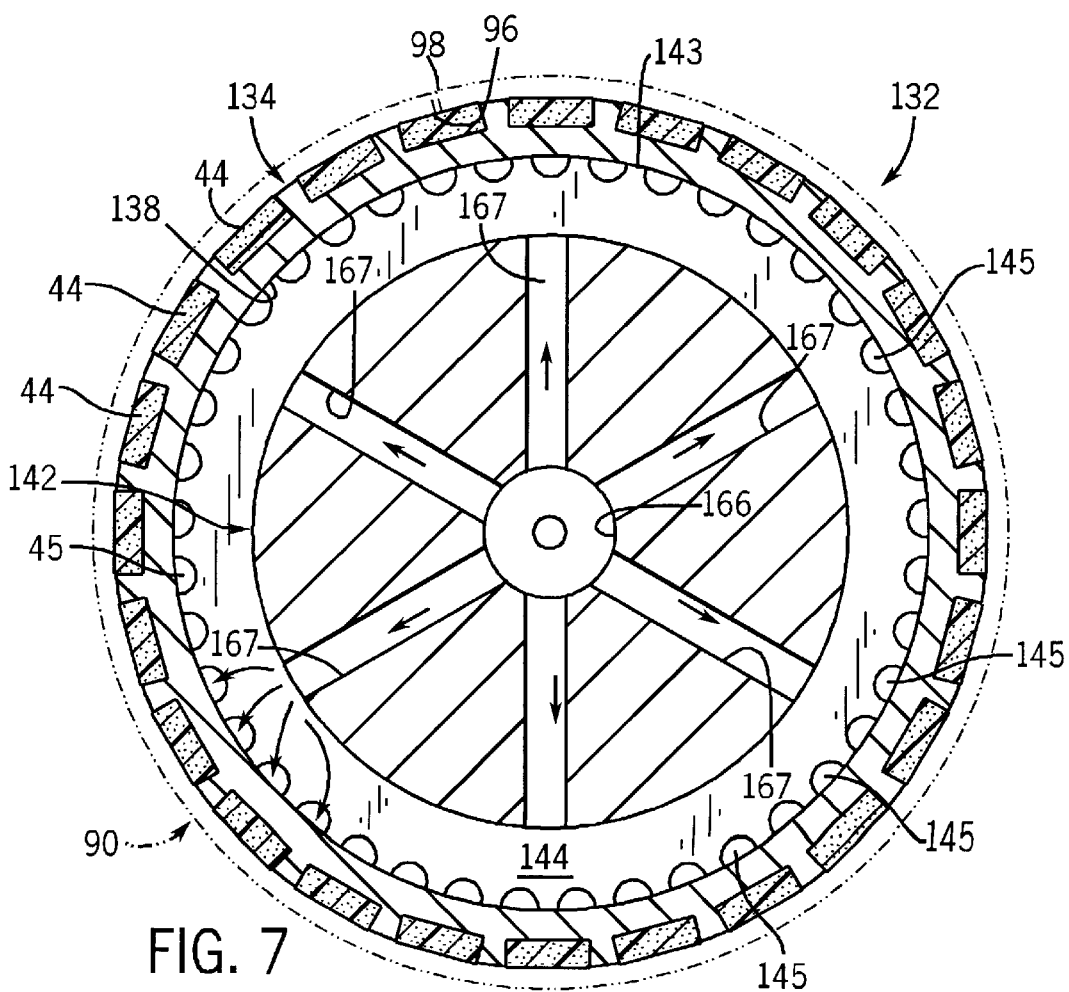
FIG. 7 is a cross-sectional view taken along line 7—7 of FIG. 6.
Figure 6:
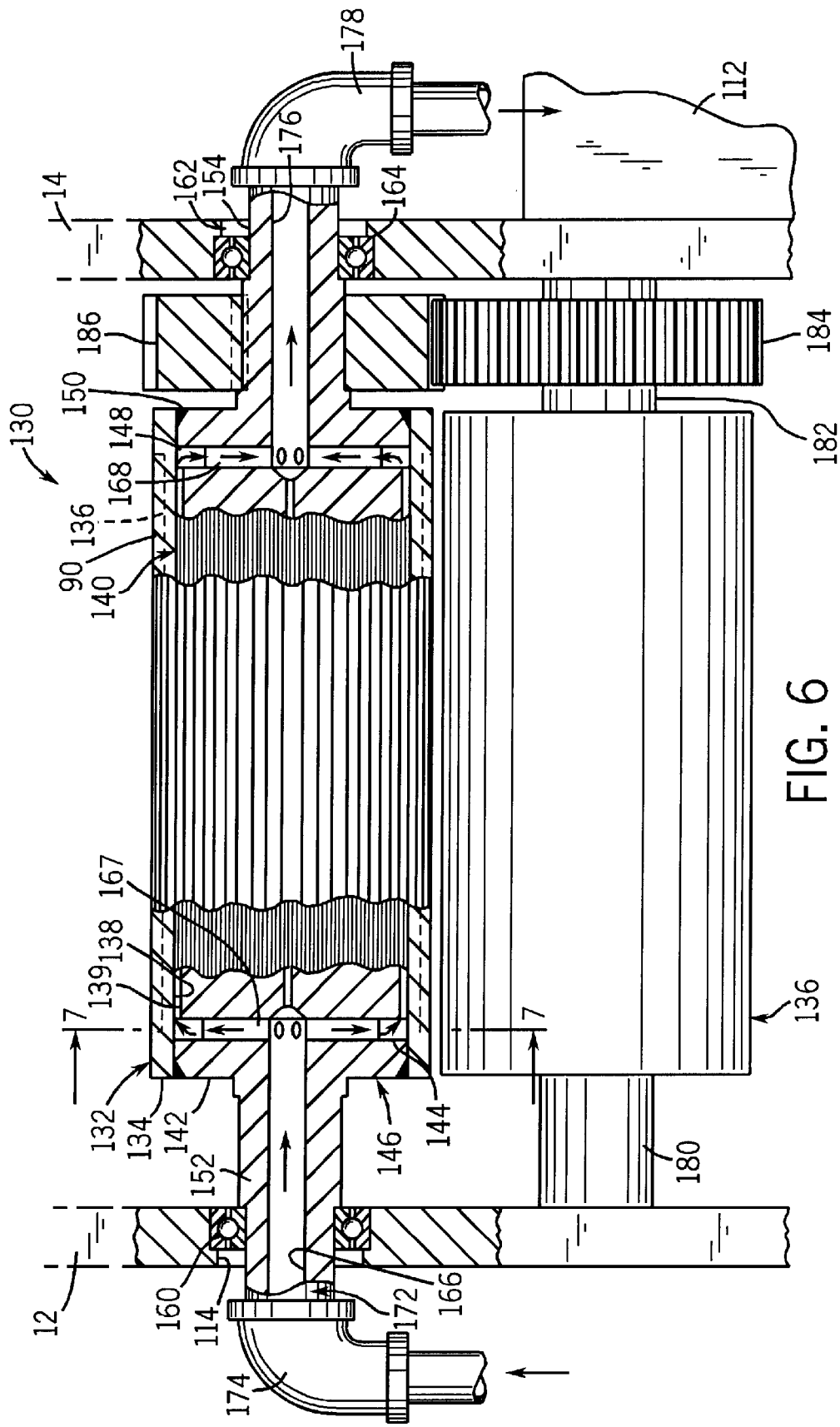
FIG. 6 is a side elevational view, partially in section, showing an alternate rotary hot foil stamping system in accordance with the present invention.

Referring to FIGS. 6–7, A rotary hot foil stamping system incorporating an alternate heating structure for heating the transfer cylinder 24 is disclosed, and generally designated by the reference numeral 130. It will be understood that rotary hot foil stamping system 130 incorporates common elements of rotary hot foil stamping system 10 heretofore described. As such, the prior description of rotary hot foil stamping system 10 will be understood to describe common elements with rotary hot foil stamping system 130 with common reference characters being used.

Referring to FIG. 6, rotary hot foil stamping system 130 includes a transfer cylinder 132 and an impression roll 135. Transfer roll 132 includes a generally cylindrical core 134 which extends along a longitudinal axis and has a generally cylindrical outer surface 136. Outer surface 136 of cylindrical core 134 includes a plurality of circumferentially-spaced magnet receiving troughs 36a–36j as described heretofore with respect to cylindrical core 28. Magnets 44 are mounted within corresponding magnet receiving trough 36a–36j in the same manner as heretofore described with respect to cylindrical core 28 of rotary hot foil stamping system 10. The die plate 90 is mounted about cylindrical core 132 in the same manner as heretofore described with respect to cylinder core 28 of rotary hot foil stamping system 10.

Cylindrical core 134 of transfer cylinder 132 further includes a generally cylindrical inner surface 138 which defines a generally cylindrical passageway 139 through cylindrical core 132. A cylindrical fluid guide structure 140 is inserted within the passageway 139 through cylindrical core 132. Fluid guide structure 140 include a generally cylindrical central portion 142 which defines an outer surface 143 which engages the inner surface 138 of cylindrical core 134. Central portion 142 of fluid guide structure 140 includes a plurality of radially-spaced, longitudinally-extending fluid passageways 145 which extend between a first, generally circular chamber 144 at the first end 146 of central portion 142 and a second, generally circular chamber 148 which is positioned adjacent a second end 150 of central portion 142 of fluid guide structure 140.

Stub axles 152 and 154 extend from corresponding ends 146 and 150 of central portion 142 of fluid guide structure 140 along a common axis. Stub axle 152 received in opening 114 in support leg 12 and is rotatably supported therein by bearing 160. Similarly, stub axle 154 extends through an opening 162 in support leg 14 and is rotatably supported therein by bearing 164.

A central fluid passageway 166 extends axially through stub axle 152, central portion 142 and stub axle 154 of fluid guide structure 140. A plurality of flow channels 167 diverge from central fluid passageway 166 and communicate with chamber 144 within the central portion 142 of fluid guide structure 140. Similarly, a plurality of flow channels 168 diverge from central fluid passageway 166 and communicate with chamber 148 within central portion 142 of fluid guide structure 140.

Central fluid passageway 166 of fluid guide structure 140 includes an input end 172 in communication with an input tube 174 which, in turn, is operably connected to a heated fluid source. Control fluid passageway 166 in fluid guide structure 140 further includes an output end 176 which is rotatably supported and in communication with an output tube 178.

Impression roll 135 includes stub axles 180 and 182 which project from opposite ends thereof, and which lie along a common axis. Stub axle 180 is rotatably supported by support leg 12 and stub axle 182 is rotatably supported by support leg 14. A gear 184 is journaled on stub axle 182 of impression roll 135. Gear 184 is meshed with a gear 186 is journaled on stub axle 154 of fluid guide structure 140. Rotation of impression roll 135, and hence meshed gears 184 and 186 causes co-rotation of transfer cylinder 132 in an opposite direction of rotation at the same angular velocity.

In operation, heated fluid is pumped into input end 172 of central fluid passageway 166 in fluid guide structure 140 through input tube 174. A portion of heated fluid 166 passes through central fluid passageway 166 in fluid guide structure 140 and out of output end 176 into output tube 178. In addition, a portion of the heated fluid is diverted through flow channels 167 and into chamber 144 adjacent the first end 146 of central portion 142 of fluid guide structure 140. The fluid in chamber 144 is urged by pressure along fluid passageways 145 along the outer surface 143 of the central portion 142 of fluid guide structure 140. As the heated fluid passes through fluid passageways 145, cylindrical core 132 is heated in such a manner that the outer surface 92a of die plate 90 reaches a predetermined temperature typically less than 475° F.

Heated fluid flows through passageways 145 and into chamber 148 adjacent the second end 150 of central portion 142 of fluid guide structure 140. Flow channels 168 redirect the fluid in chamber 148 into central fluid passageway 166 and out of output end 176.

As heretofore described, drive mechanism 112 rotates impression roll 135. Gear 184 journaled on stub axle 182 meshes with gear 186 journaled on stub axle 154 of transfer cylinder 132 causing transfer cylinder 132 to rotate about its longitudinal axis. Transfer cylinder 132 and impression roll 135 draw the web of material 120 through the gap therebetween. As transfer cylinder 132 is rotated, tool 124 engraved on the outer surface 92 of die plate 90 engages the web of foil material and transfers the foil image onto the substrate.

A still further alternate heating structure for heating transfer cylinders 24 and 134 is disclosed in U.S. patent application, Ser. No. 09/124,100, entitled "Web Heating and Pressing Apparatus" by Eugene W. Wittkopf, which was filed on Jul. 29, 1998. U.S. patent application Ser. No. 09/124,100 is assigned to the assignee of the present application and is incorporated herein by reference.

Various modes of carrying out the invention are contemplated as being within the scope of the following claims particularly pointing out and distinctly claiming the subject matter regarded as the invention.

I claim:

1. A cylinder assembly for transferring foil onto a substrate, comprising:
   a core defining a generally cylindrical outer surface;
   a plurality of magnets, each of the magnets secured within the core;
   a die plate having an inner surface and an outer surface formed from a metallic material, the inner surface of the die plate engaging the outer surface of the core such that the die plate is retained on the core by the magnetic force of the magnets; and
   a heating structure operatively connected to the core, the heating structure heating the outer surface of the die plate to a predetermined temperature.

2. The cylinder assembly of claim 1 wherein the outer surface of the core including a plurality of magnet receiving depressions therein.

3. The cylinder assembly of claim 2 wherein each magnet is mounted within a corresponding depression in the outer surface of the core.

4. The cylinder assembly of claim 3 wherein the magnets are secured within the depressions by an adhesive.

5. The cylinder assembly of claim 4 wherein the adhesive is an epoxy.

6. The cylinder assembly of claim 1 wherein the predetermined temperature is less than 475° F.

7. The cylinder assembly of claim 1 wherein the outer surface of the die plate includes tool thereon.

8. The cylinder assembly of claim 1 wherein the magnets are formed from a rare earth metal.

9. The cylinder assembly of claim 1 wherein the core defines a heating element receipt cavity therein.

10. The cylinder assembly of claim 9 wherein the heating structure includes a cal rod received within the heating element receipt cavity in the core.

11. The cylinder assembly of claim 1 wherein the core defines a heating passageway therethrough.

12. The cylinder assembly of claim 11 wherein the heating structure includes a fluid flowing through the heating passageway in the core.

13. The cylinder assembly of claim 12 wherein the fluid is oil.

14. A foil transfer device, comprising:
   a cylindrical core rotatable about a first axis and defining an outer surface;
   a die plate defining first and second edges and having an outer surface formed from a metallic material, the die plate positioned about the outer surface of the cylindrical core;
   a magnet mounted within the cylindrical core, the magnet retaining the die plate about the cylindrical core and preventing slippage of the die plate along the outer surface of the cylindrical core; and
   a heating structure operatively connected to the cylindrical core for heating the die plate.

15. The device of claim 14 wherein the outer surface of the cylindrical core includes a magnet receiving depression therein.

16. The device of claim 15 wherein the magnet is mounted within the magnet receiving depression in the outer surface of the cylindrical core.

17. The device of claim 16 wherein the magnets are secured within the depressions by an adhesive.

18. The device of claim 17 wherein the adhesive is an epoxy.

19. The device of claim 14 further comprising an impression roll extending along a second axis, parallel to the first axis, and defining a generally cylindrical outer surface.

20. The device of claim 19 wherein the impression roll includes an impression gear projecting radially from the outer surface thereof.

21. The device of claim 20 further comprising a core gear extending radially from the outer surface of the core, the core gear meshing with the impression gear such that rotation of the core causes rotation of the impression roll.

22. The device of claim 21 wherein the magnets are formed from a rare earth metal.

23. The device of claim 14 wherein the core defines a heating element receipt cavity therein.

24. The device of claim 23 wherein the heating structure includes a cal rod received within the heating element receipt cavity in the core.

25. The device of claim 14 wherein the core defines a heating passageway therethrough.

26. The device of claim 25 wherein the heating structure includes a fluid flowing through the heating passageway in the core.

27. The device of claim 26 wherein the fluid is oil.

28. The device of claim 14 wherein the heating structure heats the outer surface of the die plate to a temperature less than 475° F.

29. The device of claim 14 further comprising a support for supporting the cylindrical core above a supporting surface.

30. The device of claim 29 wherein the support includes first and second vertical support legs.

31. The device of claim 14 further comprising a drive mechanism for rotating the cylindrical core.

32. A device for transferring foil onto a substrate, comprising:
   a cylindrical core rotatable about a first axis and defining an outer surface;
   a die plate defining first and second edges and having a first side and a second opposite side formed from a metallic material, the die plate positioned about the outer surface of the cylindrical core such that first side of the die plate engages the outer surface of the cylindrical core;
   a plurality of magnets, each magnet mounted within the cylindrical core, the magnets retaining the die plate about the cylindrical core; and
   a heating structure operatively connected to the cylindrical core, the heating structure heating the second side of the die plate to a temperature less than 475° F.

33. The device of claim 32 wherein the outer surface of the cylindrical core including a plurality of circumferentially spaced rows of magnet receiving depressions therein.

34. The device of claim 33 wherein each magnet is mounted within a corresponding magnet receiving depression in the outer surface of the cylindrical core.

35. The device of claim 34 wherein the magnets are secured within the depressions by an adhesive.

36. The device of claim 35 wherein the adhesive is an epoxy.

37. The device of claim 32 further comprising an impression roll extending along a second axis, parallel to the first axis, and defining a generally cylindrical outer surface.

38. The device of claim 37 wherein the impression roll includes an impression gear projecting radially from the outer surface thereof.

39. The device of claim 38 further comprising a core gear extending radially from the outer surface of the cylindrical core, the core gear meshing with the impression gear such that rotation of the cylindrical core causes rotation of the impression roll.

40. The device of claim 39 further comprising a drive mechanism for rotating the cylindrical core.

41. The device of claim 32 wherein the magnets are formed from a rare earth metal.

42. The device of claim 32 wherein the core defines a heating element receipt cavity therein.

43. The device of claim 42 wherein the heating structure includes a cal rod received within the heating element receipt cavity in the core.

44. The device of claim 32 wherein the core defines a heating passageway therethrough.

45. The device of claim 44 wherein the heating structure includes a fluid flowing through the heating passageway in the core.

46. The device of claim 45 wherein the fluid is oil.

* * * * *